W. C. STEVENS.
BEAD CEMENTING APPARATUS.
APPLICATION FILED MAY 15, 1920.
1,379,369.
Patented May 24, 1921.
2 SHEETS—SHEET 1.
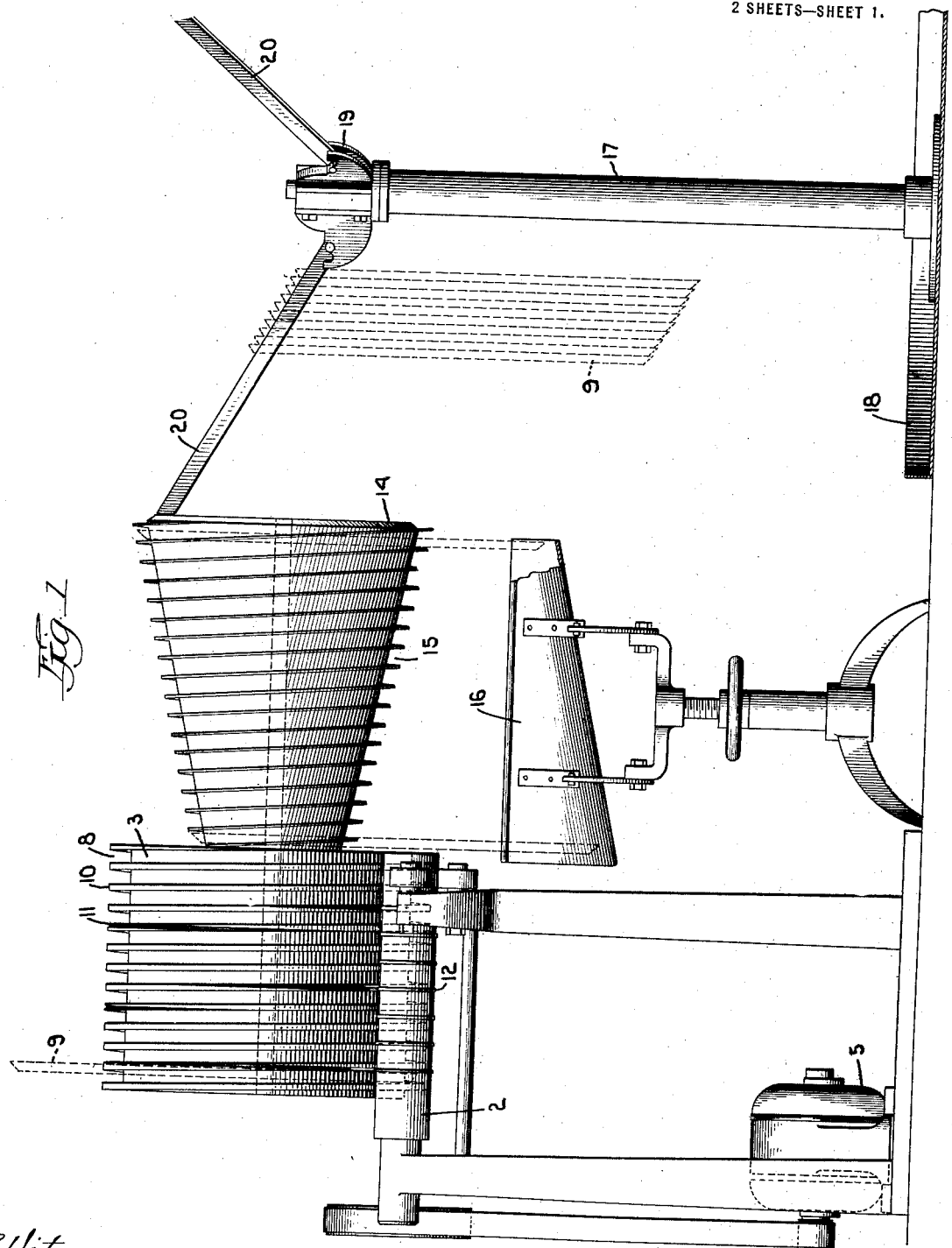

W. C. STEVENS.
BEAD CEMENTING APPARATUS.
APPLICATION FILED MAY 15, 1920.
1,379,369.
Patented May 24, 1921.
2 SHEETS—SHEET 2.
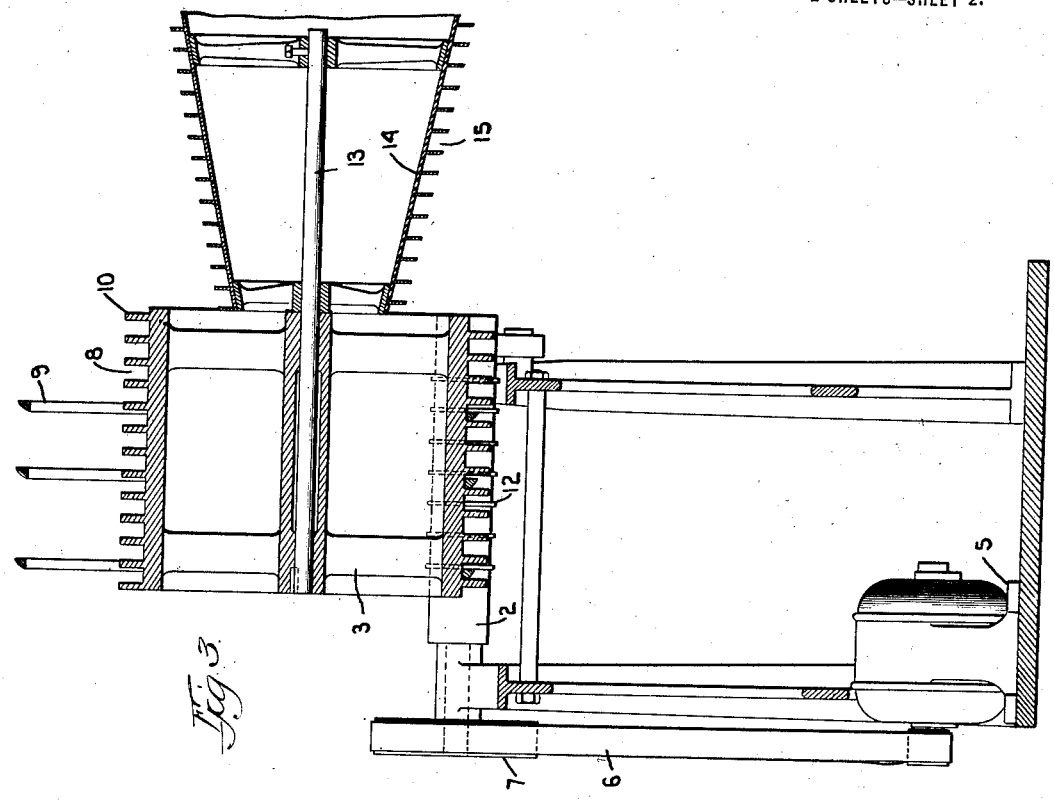
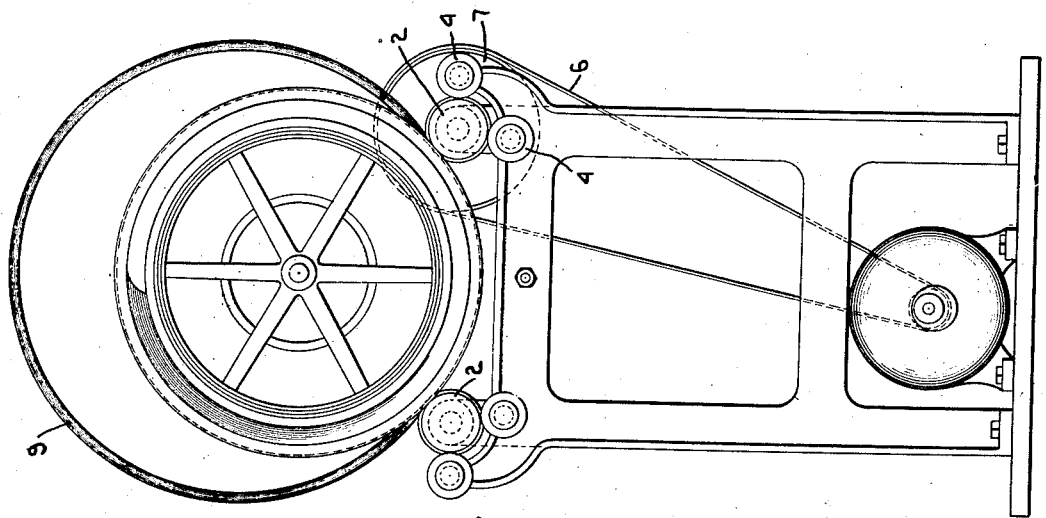
Witness:
Inventor:
William C. Stevens,

UNITED STATES PATENT OFFICE.

WILLIAM C. STEVENS, OF AKRON, OHIO, ASSIGNOR TO THE FIRESTONE TIRE AND RUBBER COMPANY, OF AKRON, OHIO, A CORPORATION OF OHIO.

BEAD-CEMENTING APPARATUS.

1,379,369.  Specification of Letters Patent.  Patented May 24, 1921.

Application filed May 15, 1920. Serial No. 381,595.

*To all whom it may concern:*

Be it known that I, WILLIAM C. STEVENS, a citizen of the United States, residing at Akron, in the county of Summit and State of Ohio, have invented certain new and useful Improvements in Bead-Cementing Apparatus, of which the following is a specification.

This invention relates to an apparatus for cementing or coating tire beads with rubber cement prior to their incorporation in the tire structure. This invention relates particularly to apparatus for cementing beads which are in the form of continuous annular rings.

Apparatus has been in continuous and successful operation, prior to my invention, for cementing clencher beads, by which term will be understood to be included beads made of rubber without metallic or other reinforce and, therefore, extensible, which beads have been placed in an apparatus in lengths and then circled, stapled and passed through the cement tank or bath. This apparatus has been satisfactory for the purpose of manufacturing and cementing beads which are furnished in lengths and then circled in the machine, but in the manufacture of endless beads, such as used in the production of straight side tires, the machine has proven inadequate.

The reason for the inadaptability of the machines of the prior art for handling straight side beads, is due to the fact that such beads are formed and semi-cured in circular form before being cemented and it has been found impossible to pass them through a machine in a continuous stream.

For this reason the old method of mass dipping by hand has obtained to the present time, an operation which is messy and wasteful of cement and very uncertain as to product.

The object of this invention is to devise a dipping means which can be used to carry the beads in a continuous stream through the cementing apparatus and deliver them to a drying rack on which they can be supported until ready for use in the tire.

In the drawings is shown one embodiment of my invention, which may be modified if desired. It is also evident that while the apparatus is designed for use in the factories in the coating of beads, the invention is not so limited, but may extend to other or analogous uses.

In the drawings:

Figure 1 is a side elevation of a machine for dipping straight side or continuous beads.

Fig. 2 is an end elevation.

Fig. 3 is a vertical section.

The machine of this invention embodies a base or standard 1, in the upper ends of which are mounted rotatable shafts 2, the surfaces of which are formed as cylinders to support or cradle a drum 3. The outer ends of the shafts are supported on rollers 4. Any suitable means may be provided for rotating the drum 3, such as a motor 5 secured to the base and connected by belt 6 to a pulley 7 secured to one of the shafts 2.

In the surface of the drum 3 is formed a continuous spiral groove 8 of depth slightly greater than the depth of the beads 9, or other articles to be handled in the machine. In the ribs 10 forming the groove is cut a plurality of circumferential grooves 11 of sufficient depth to receive circumferential ribs 12 formed on the cylinder 2. The grooves 11 and ribs 12 are of sufficient number to guide the drum 3 and insure it remaining in its proper place on the cylinders 2. The ribs are not high enough to interfere with the passage of the beads.

Centrally located within the drum 3 is a shaft 13 the end of which projects from the drum and carries a light metallic cone or dipping drum 14 which is preferably arranged with its smaller end adjacent the drum 3. The outer surface of drum 14 is formed with a spiral groove 15 into which the beads fall as they pass off the drum 3, out of the groove 8. The weight of the drum 3 is sufficient to support the drum 14 without other means.

Located beneath the drum 14 is a tank or a pan 16 which is kept supplied with cement. The pan may be formed with an inclined bottom paralleling the upper surface of the drum 14, the outer end being open so that the beads may pass out of the tank. As the beads are carried on the smaller end of the core, they are dipped in the rubber cement and, as the cone revolves, are carried up out of the bath and are conveyed to the storage and drying racks.

These racks comprise a stanchion or upright 17 located within a drip pan 18, the upper end of the stanchion supporting a rotary head 19 from which project a suitable number of arms 20, inclined upwardly. In this manner the beads are supported as shown in Fig. 1, until an arm is filled, when the head will be rotated and a second arm brought into coöperation with the drum. After the arms have been supported for the required length of time to allow the beads to drip the surplus cement into the pan 18, they are removed and placed in a suitable storage space.

The dipping and drying device, *per se*, is not my invention, but the combination of the dipping device with the spiral drum for feeding the beads is the novel device contained in this application, and by use of this device, or similar devices, it is possible to handle continuous beads through the cementing apparatus in an uninterrupted stream. The two drums may be considered as a single drum, if desired, and may be so constructed, in which case the part 3 may be termed as the cylindrical or supporting section, and the part 14 as the conical or dipping section, the part where the two join being a step-off allowing the article to drop into the coating bath. It will also be understood that during the first position of their travel, the beads are supported from beneath, while during the latter half they are allowed to hang, whereby they enter the tank.

It is obvious that, while the description of the invention has been somewhat detailed, the details are non-essential and may be varied within the scope of the invention. Modifications and alterations in proportions and arrangement of parts may be made without changing the invention or sacrificing any of its benefits.

I claim:

1. In an apparatus for treating annular bodies, a drum, rollers supporting said drum, a spiral groove in the drum and a dipping drum supported wholly by said first named drum.

2. In an apparatus for treating annular bodies, a drum, rollers supporting said drum, a spiral groove in the drum, means for restraining said drum from longitudinal movement, and a dipping drum supported wholly by said first named drum.

3. In an apparatus for treating annular bodies, a drum, means to support and rotate said drum from its outer periphery, a spiral groove in the drum, and a dipping device supported by said drum, and fed thereby.

4. A device for coating beads, comprising a bead supporting drum, and means for supporting said drum which permits annular beads to pass from end to end through the said device.

5. A device for coating beads, comprising a bead supporting drum, having provision for advancing beads and means for supporting said drum which permits annular beads to pass from end to end through said device.

6. A machine for coating annular articles including a drum, comprising a cylindrical supporting section and a dipping section, a coating tank below the drum, there being a step-off at the junction of the two said parts whereby the annular articles are dropped into the tank.

7. A machine for coating annular articles including a drum, comprising a cylindrical supporting section and a dipping section, a coating tank below the drum, there being a step-off at the junction of the two said parts whereby the annular articles are dropped into the tank, and a spiral groove extending along both sections of said drum.

8. A machine for treating annular articles including a drum, comprising a supporting section, rollers beneath said supporting section, a treating section on said drum, a treating tank below the treating section, and a spiral groove on each said section.

9. A machine for treating annular articles including a drum, comprising a supporting section, rollers beneath said supporting section, interengaging formations on said supporting sections and said rollers to prevent longitudinal shifting, a treating section carried by said supporting sections and a tank beneath said treating section.

10. A machine for treating annular articles including a drum, comprising a supporting section, rollers beneath said supporting section, interengaging formations on said supporting sections and said rollers to prevent longitudinal shifting, a treating section carried by said supporting section, a tank beneath said treating section, and a spiral groove on each said section.

11. A machine for coating annular tire beads, comprising a drum, an annular groove throughout the length of said drum, rollers cradling said drum over a portion of its length and a coating tank beneath the other portion of said drum.

12. A machine for coating annular tire beads, comprising a drum, an annular groove throughout the length of said drum, rollers cradling said drum over a portion of its length and a coating tank beneath the other portion of said drum, and means on said rollers to engage the drum and prevent longitudinal movement thereof.

13. A machine for coating tire beads comprising a drum, means to rotatably support the drum and the beads from below, the remainder of the drum being unsupported, at which portion the beads hang from their upper sides, and a tank beneath the unsupported portion of said drum.

14. A machine for coating tire beads, comprising a drum, means to rotatably support the drum and the beads from below, the remainder of the drum being unsupported, at which portion the beads hang from their upper sides, a tank beneath the unsupported portion of said drum, and a spiral groove along said drum.

15. A machine for coating tire beads, comprising a drum, rollers to rotatably support the drum and the beads from below, interengaging grooves and ridges on said rollers and said drum, the remainder of the drum being unsupported, at which portion the beads hang from their upper sides, a tank beneath the unsupported portion of said drum and a spiral groove extending the whole length of said drum.

WILLIAM C. STEVENS.